March 10, 1970  J. F. MENKE  3,500,048
SIGHTING DEVICE AND METHOD FOR DETERMINING A LINE OF SIGHT TO
A TARGET AND THE POSITION OF AN OBJECT RELATIVE TO
THE LINE OF SIGHT
Filed Sept. 8, 1964  2 Sheets-Sheet 1

INVENTOR
JOSEPH F. MENKE

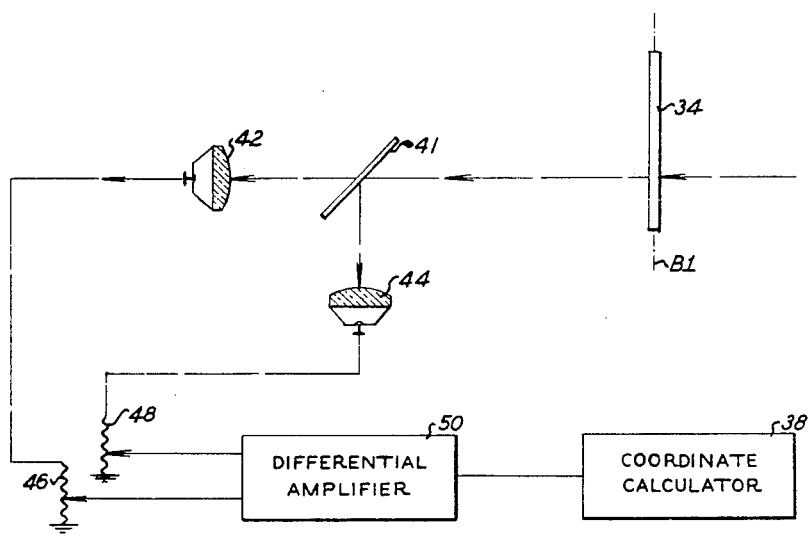
Fig.4
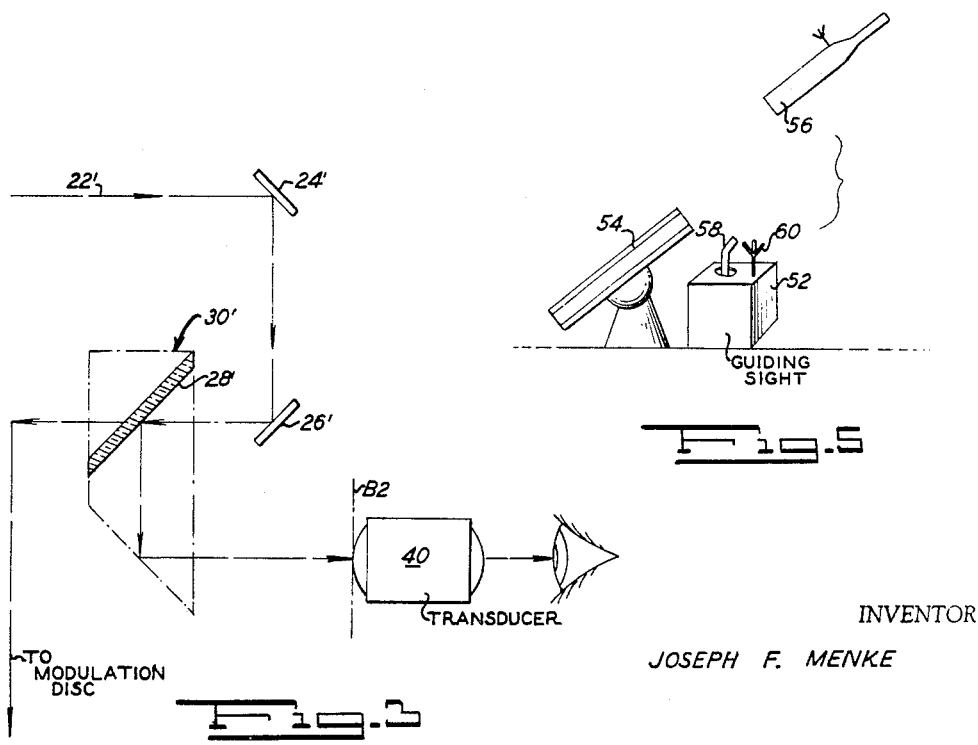
Fig.5
Fig.3
INVENTOR
JOSEPH F. MENKE

3,500,048
SIGHTING DEVICE AND METHOD FOR DETERMINING A LINE OF SIGHT TO A TARGET AND THE POSITION OF AN OBJECT RELATIVE TO THE LINE OF SIGHT
Joseph F. Menke, Heidelberg, Germany, assignor to Eltro G.m.b.H. & Co., Heidelberg, Germany
Filed Sept. 8, 1964, Ser. No. 395,645
Claims priority, application Germany, Sept. 17, 1963, E 25,529
Int. Cl. G01j 1/20
U.S. Cl. 250—83.3      10 Claims

ABSTRACT OF THE DISCLOSURE

To determine the coordinates of a missile relative to a target, a sight is provided to locate the target and at the same time collect radiation from the missile. The collected energy is divided into a visually receivable image and into energy which is used to determine the position of the missile relative to a line of sight to the target.

---

The present invention relates to apparatus for the production of two images in different wavelength ranges of one object. More specifically, the invention relates to an arrangement which, in connection with appropriate auxiliary electronic devices or instruments can be used as an automatic guiding sight for flying bodies such as missiles.

The previously known optical systems, including optical mirror or reflecting systems and prism systems, generally produce an image over the entire permeability range or reflection range of the optical system depending on the glass or mirror material used. Several possibilities of narrowing or limiting the spectral range have become known in the art, such as, for example, the inclusion of spectral range filters, the vapor treatment of the mirrors with coatings which reflect only in the desired spectral range, and the development of the correction lenses of image converter tubes and scanning tubes as filters. It is also known to produce a plurality of images in different spectral ranges by means of filters. Also known in the art is the method of separating the visible spectral range from the infrared spectral range in an infrared night visibility instrument by means of a coating acting as infrared filter.

An object of the invention is to provide an improved sighting device which can be used as a guided-missile sight.

Another object of the invention is to provide an improved sighting device requiring only optical components.

A further object of the invention is to provide a sighting device which can simultaneously give a visible indication of an object as well as its coordinates with respect to the axis of said sighting device.

The invention contemplates an arrangement for the production of two images in different wavelength ranges of an object. The arrangement is characterized in that a member of an optical system is permeable to one wavelength range and reflecting for the other wavelength range. The member is so developed that the two beams leaving the member produce a real image in each case.

It should be noted that in contradistinction to the known arrangements, the division of the entire radiation beam is carried out by means of a member with optical properties, so that two images are formed simultaneously in separate wavelength ranges.

Preferably, it is possible to view these two images simultaneously on two associated sighting or viewing instruments or, alternately, briefly on one instrument and then the other or to put them together again by way of an analogous optical system and to represent the separate spectral arrangements by different colors. Such an arrangement represents an excellent method of decamouflaging objects which are camouflaged both against vision and against infrared. Such a system has been described in my copending application Ser. No. 365,239 filed May 4, 1964, now Patent No. 3,379,830.

In addition, according to the invention one beam may comprise visible radiation which is fed through an optical system for direct viewing by an observer and the other beam may comprise infrared radiation which is fed via a goniometer system for determining the coordinates of the object. Alternatively according to another aspect of the invention both beams of radiation may be in the infrared portion of the radiation system and the first beam may pass through transducers to create a viewable image while the second beam is fed through a goniometer system.

A feature of the invention contemplates a differential detection arrangement of the second beam for cancelling out spurious or background radiation.

Other objects, features and the advantages of the invention will be apparent from the following detailed description of the invention when read with the accompanying drawings which show by way of example and not limitation several embodiments of the invention. In the drawings:

FIG. 3 is an alternate embodiment of the system of FIG. 2;

FIG. 4 is a schematic diagram of differential detection apparatus for use with the systems of FIGS. 2 and 3; and FIG. 5 is a schematic representation of a missile guidance system utilizing the invention.

Figure 1:
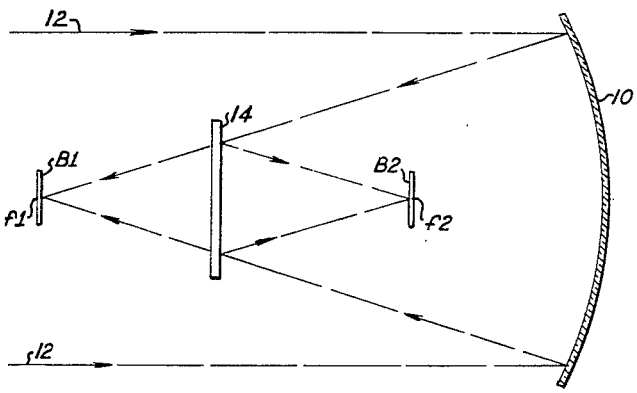
FIG. 1 shows an optical system for providing two real images of an object in accordance with the invention.

Referring now to FIG. 1 there is shown an optical mirror or reflecting system which comprises a main mirror 10 which reflects the entire incident radiation 12 onto a counter-mirror 14. However, counter-mirror 14 differs from conventional counter-mirrors in reflecting optical systems in that it reflects only one spectral range and transmits the other without weakening it. The production of partially transparent mirrors which as a consequence of selective "silvering" pass the radiation of one range of wavelengths, e.g. infrared radiation, and reflect the other, e.g. visible radiation are well known. For example, they have been described in Foto-Kino-Technik No. 8 (1949) "Cold Light and Interference Filters" at col. 3, page 187 as well as in German Patent No. 1,955,474 issued Apr. 23, 1959. In accordance with this separation, one spectral range is focused in the focal point $f_1$ and is reproduced in the image plane B1. The second spectral range is reflected and focused at focal point $f_2$ and is reproduced in the image plane B2.

Analogously, it is possible to arrange any suitable receiver for representing the image in the image plane of the two spectral ranges. For example, in the case of active-passive separation in the infrared, the separating boundary between the two ranges may be approximately 2μ (micron). Accordingly, the image of the short-wave radiation is formed in the image plane B1 and is scanned by suitable instruments and is thus represented, whereas the purely thermally radiating image content becomes visible by the image scanned in image plane B2.

The counter-mirror 14 is provided, in a manner known per se as described above, with an optical high-pass filter, so that it is transparent for short wavelengths and is reflecting starting with a given wavelength. The counter-mirror 14 may be plane, as shown in FIG. 1, but may also have any other shape or form depending on the requirements of the optical system.

In addition, the present invention broadly contemplates that, within an arrangement of optical elements, a member which is permeable to one wavelength range and reflecting for the other wavelength range and which is so arranged that the two beams leaving the member produce a real image in each particular case, be arranged in such a manner that it is possible to use one image for the visual observation of an object or of objects, e.g. of a target and of a missile represented in the image. Plane B2 and the other image for determining the co-ordinates of an object such as the missile represented in the image plane B1.

The member may, for example, form the counter-mirror of a reflecting (mirror) optical system. However, according to a main embodiment of the invention, the member forms a prismatic surface of a multiple-part prismatic reversing system, in which case all parts or members of the optical system have a common ray-incidence optical system.

The image in the image plane B2 may, for example, be produced in the visible wavelength range and can be viewed through an eye-lens, while the image in the image plane B1 is produced in the infrared range. The radiation of an image point in image plae B1 impinges, after frequency modulation by means of a modulation disc rotating eccentrically about the optical axis and constantly about its central axis, on a receiving transducer element, so that the polar co-ordinates of the image points with respect to the center of the image plane can be clearly and unequivocally determined from the characterizing values of the frequency modulation.

Another embodiment of the invention contemplates producing an image in the image plane B1 in the short-wave infrared range and to look at it with the aid of conventional image converter tube system, and in producing an image in the image plane B2 in the long-wave infrared range, in which case the radiation of an image point in this range is subjected to frequency modulation in the same manner as described above and can thereby be used for determining the co-ordinates of the image point. In the latter case, an appropriate transducer element is also arranged beyond the modulation disc.

Figure 2:
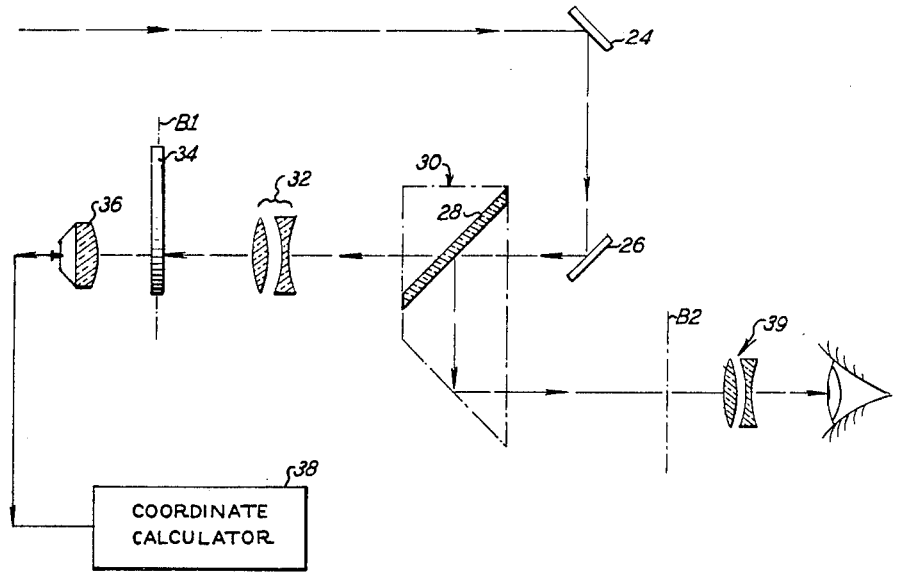
FIG. 2 is a schematic diagram of a system for simultaneously providing a viewable image of an object and its coordinates.

More particularly, FIG. 2 shows a mirror system with a prismatic reversing system for the production of the two images in different wavelength ranges.

According to FIG. 2, the entire radiation 22 passes through a common ray-incidence optical system and successively impinges on the mirrors 24 and 26 and is thereby guided toward the prismatic surface 28 of a prismatic reversing system 30. Prismatic surface 28 is permeable to the infrared wavelength range, so that this portion of the rays is able to arrive unweakened on a modulation disc 34 by way of an optical system 32. The modulation disc 34 is located in the image plane B1. Disc 34 comprises permeable slots and impermeable webs and rotates about its central axis as well as eccentrically about the optical axis. Accordingly the infra-red radiation passing through the permeable slots is frequency modulated. Such discs and the modulation processes are fully described in my copending applications Ser. No. 197,834 (filed May 24, 1962) and Ser. No. 369,359 (filed May 20, 1964). The frequency-modulated radiation then impinges on a receiving element 36 which transduces the radiation to a frequency-modulated electrical signal that is fed to coordinate calculator 38. Calculator 38 is preferably of the type described in my above cited copending applications. The radiation of the visible wavelength range reflected by the prismatic surface 28 is turned round again within the reversing system 30 and is used for the production of the visible image in the image plane B2. For example, if the radiating object is punctiform it will be represented, on the one hand, in the image plane B2 as image point which can be viewed directly by an observer by means of an eye-piece or eye-lens 39, while, on the other hand, the infrared radiation emanating from the object also produces the representation of the object as an image point in the image plane B2, the co-ordinates of the image point being determined in the manner described above.

Basically, this aspect of the invention consists in that, for example, an object represented as an image point or dot in two different wavelength ranges can be observed simultaneously visually on the one hand, and, on the other, in its co-ordinate position within the image plane. A variation of this aspect of the invention is shown in FIG. 3. Since the system of FIG. 3 is similar to that of FIG. 2 except that radiation directed to image plane B2 is in the long infra-red range, primed reference characters will be used for like elements and only the differences will be described in detail. In particular, the surface 28' of reversing system 30' is coated to be permeable to short infrared radiation which is fed to a modulation disc-receiving element-coordinate calculator system similar to that shown in FIG. 2, and to be reflective to long infrared radiation which it directs to transducer 40. Transducer 40 is preferably an image converter tube system whose input is sensitive to long infrared radiation and whose output is a viewable picture.

With respect to the coordinate generating portion of the radiation it is possible that a portion of this radiation is undesired background radiation or "noise." Therefore, according to a feature of the invention there is provided means for separating this noise. Such means are shown in FIG. 4.

As shown in FIG. 4, another optical member or coated mirror 1 acting as interference layer is provided beyond (at the back of) the modulation disc 34. Member 1 is, in turn, permeable to a portion of the infrared wavelength range (for example, λ=1.9 to 2.7μ) and reflecting for the other portion of the infrared wavelength range (for example, λ=1.1 to 1.8μ). Two receiving transducer elements 42 and 44 in the form of IR cells, bolometers, etc. which are sensitive to the wavelength ranges respectively receive the transmitted and reflected radiation.

This ensures that the interfering background radiation can be suppressed to a substantial degree by an automatic or manual control of the signal of the receiving elements 42 and 44 and that only the radiation, approximately within the range from 1.9 to 2.7μ, of the object to be detected, produces the signal required for determining the co-ordinates.

The arrangement according to the invention may be developed, more particularly in connection with additional electronic instruments as a sighting device for an automatic guided-missile which is provided with a radiation emitter and is to be guided to a target. The visible image produced in the image plane B2 is for a sighting telescope used for sighting the target. The infrared portion of the radiation which is separated at the prism surface 28 (FIG. 2) and reaches the image plane B1 is used for determining the co-ordinates of the image point representing the missile with respect to the optical sighting line passing through the sighting means and the target and accordingly acts as an infrared goniometer. It is therefore possible to produce readjustment signals for the missile fired at the target from the co-ordinate values corresponding to the distance difference of the missile from the launching pad to target axis. This makes it possible to realize, by way of a directly connected computing and control device, the automatic initial steering and readjustment of the missile along the optical line of sight to the target. In the special case of launching ground-to-ground missiles, the entire steering sight is arranged laterally on the launching unit, in which case the sighting device is partly developed as sighting telescope or telescopic sight.

In FIG. 5 there is shown such a system wherein a guiding sight 52 is disposed adjacent a launching pad 54 for directing a missile 56. The entire guided-missile sight 52 includes a periscope sight 58 hereinafter more fully described, a calculator, a transmitter and a transmitting antenna 60 which sends correction signals to the antenna 62 of missile 56. Within missile 56 is a control signal responsive guidance unit which controls aerodynamic surfaces and/or auxiliary jets to correct the direction of flight of missile 56.

The periscope sight 58 which comprises the optical elements for the sighting telescope and for the infrared receiving system as well as the modulation device with the receiving elements, is in the form of a periscope with a common viewing window for the two systems and with an eyepiece system for the sighting telescope. The eyepiece system may be inclined, for example, by 10° with respect to the optical axis of the viewing window. This construction of the optical-mechanical member produces a compact, space-saving, low-weight, misadjustment-proof, construction convenient for sighting. The inclination of the viewing eyepiece optical system ensures excellent coverings and good tracking of the target.

In order to start the missile, only an initial rough sighting of the target is necessary. Prior to launching the missile, the potentiometers 46 and 48 connecting the transducer elements 42 and 44 to the differential amplifier 50 (FIG. 4) are adjusted in such a manner that the background radiation is suppressed. The adjustment is maintained after launching, so that only the radiation emitted by the missile and different from the background radiation is able to produce a signal from differential amplifier 50 that is fed to calculator 38.

During the flight of the missile, its accurate readjustment towards the target is effected in that the optical sighting line of the sighting telescope is caused to coincide with the target by means of sighting, and in that the control calculator supplies the accurate control signals for the missile.

There will now be obvious to those skilled in the art many modifications and variations which satisfy the objects of the invention but which do not depart from its spirit as defined by the appended claims.

What is claimed is:

1. Sighting device for simultaneously producing a visible indication of at least one object to determine a line of sight and determining the coordinates of said object relative to the said line of sight, said sighting device comprising optical means for establishing said line of sight and for collecting energy in a band of wavelengths received from the object, a selectively permeable reflector transmissive to one portion of wavelengths of said band of wavelengths and reflective to another portion of wavelengths of said band of wavelengths so that the received and collected energy of said one portion of wavelengths passes through said reflector and is focused as a first image in a first image plane and the energy of said other portion of wavelengths is reflected as a second image in a second image plane, said optical means being adapted for the visual viewing of said second image, and further means responsive to said first image for determining the coordinates of said object relative to said line of sight.

2. The sighting device of claim 1, wherein said optical means includes an eyepiece lens system.

3. The sighting device of claim 1, wherein said further means includes a modulation disc having sectors that are alternately permeable to energy of said one portion of wavelengths.

4. The sighting device of claim 1 further comprising a second selectively permeable reflector disposed optically beyond said first image plane, said second reflector being permeable to one subportion of one of said portions of said band of wavelengths and reflective to another subportion of said one of said portions of said band of wavelengths, a first transducer disposed with respect to said second reflector for receiving energy transmitted by the latter and for converting the energy of said one subportion to first electrical signals and a second transducer disposed with respect to said second reflector for receiving energy reflected by the latter and for converting the energy of said other subportion to second electrical signals and means for differentially combining said electrical signals.

5. Sighting device as claimed in claim 1, wherein said reflector includes a prism reversing system, said prism including at least one prism surface that is selectively transmissive to one portion of said band of wavelengths and selectively reflective to another portion of said band of wavelengths so that the energy of said one portion of the band of wavelengths passes through said reflector and is focused as said first image in said first image plane and the energy of said other portion of the band of wavelengths is reflected as said second image in said second image plane.

6. The sighting device of claim 5, wherein said optical means includes a pair of angularly disposed full bandwidth reflectors for guiding said received energy to said one prism surface.

7. The sighting device of claim 1, wherein said optical means includes an infrared sensitive image converter system.

8. The sighting device of claim 3, wherein said further means comprises a modulation disc including alternate sectors transmissive of said energy and means defining a central axis, said disc being rotatable eccentrically of an optical axis corresponding to said line of sight and uniformly about said central axis.

9. A method of providing a viewable image of a target and the coordinates relative to said target of an object emitting radiation having a given bandwidth, said method comprising the steps of collecting the emitted radiation at a given point along with the image of said target, the radiation and image being constituted by electromagnetic energy of a band of wavelengths, reflecting selectively a portion of the wavelengths to a second given point for visually viewing the target and selectively transmitting another portion of the wavelengths to a third given point for indicating the coordinates of the object relative to the target.

10. The method of claim 9 further comprising frequency modulating the energy at said third given point to provide characteristics indicative of the coordinates of the object relative to the target.

(References on following page)

References Cited

UNITED STATES PATENTS

| | | | |
|---|---|---|---|
| 2,960,612 | 11/1960 | Koulicovitch | 250—230 |
| 3,274,880 | 9/1966 | Lillestrand et al. | 250—203 X |
| 3,320,427 | 5/1967 | Evans et al. | 250—203 X |
| 3,348,050 | 10/1967 | Bez | 250—203 X |
| 3,339,293 | 9/1967 | Kuhlo et al. | 250—203 X |
| 2,225,044 | 12/1940 | George | 250—83 |
| 2,989,640 | 6/1961 | Turck | 250—203 |
| 3,025,515 | 3/1962 | Fairbanks | 343—6 |
| 3,199,400 | 8/1965 | Zabinski | 250—203 |
| 3,239,674 | 3/1966 | Aroyan | 250—203 |
| 3,250,174 | 5/1966 | Lutz | 88—14 |

ARCHIE R. BORCHELT, Primary Examiner

U.S. Cl. X.R.

250—203